(12) United States Patent
Semaan et al.

(10) Patent No.: US 7,181,534 B2
(45) Date of Patent: Feb. 20, 2007

(54) ADDRESS RESOLUTION PROTOCOL TO MAP INTERNET PROTOCOL ADDRESSES TO A NODE TRANSPORT IDENTIFIER

(75) Inventors: Ghassan Semaan, Fremont, CA (US); Hossein Sahabi, Fremont, CA (US)

(73) Assignee: Ciena Corporation, Linthicum, MD (US)

( * ) Notice: Subject to any disclaimer, the term of this patent is extended or adjusted under 35 U.S.C. 154(b) by 791 days.

(21) Appl. No.: 09/784,389

(22) Filed: Feb. 15, 2001

(65) Prior Publication Data

US 2002/0112077 A1    Aug. 15, 2002

(51) Int. Cl.
*G06F 15/16* (2006.01)
(52) U.S. Cl. .................. 709/245; 709/220; 709/223; 709/230; 709/249; 370/392; 370/401; 370/403; 370/445
(58) Field of Classification Search ............... 370/445, 370/404; 709/220, 223, 230, 245, 249, 238; 710/200
See application file for complete search history.

(56) References Cited

U.S. PATENT DOCUMENTS

| | | | | |
|---|---|---|---|---|
| 5,425,028 A | * | 6/1995 | Britton et al. ............. 370/389 |
| 5,958,018 A | * | 9/1999 | Eng et al. .................... 709/246 |
| 5,974,453 A | * | 10/1999 | Andersen et al. ........... 709/220 |
| 6,055,561 A | * | 4/2000 | Feldman et al. ............. 709/200 |
| 6,073,178 A | * | 6/2000 | Wong et al. ................. 709/229 |
| 6,141,690 A | * | 10/2000 | Weiman ...................... 709/228 |
| 6,289,388 B1 | * | 9/2001 | Disney et al. .............. 709/238 |
| 6,331,984 B1 | * | 12/2001 | Luciani ....................... 370/401 |
| 6,356,563 B1 | * | 3/2002 | Nicoll et al. ................. 370/466 |
| 6,378,000 B1 | * | 4/2002 | Akatsu et al. ............... 709/245 |
| 6,393,488 B1 | * | 5/2002 | Araujo ....................... 709/245 |
| 6,654,387 B1 | * | 11/2003 | Beser et al. ................. 370/485 |
| 6,963,575 B1 | * | 11/2005 | Sistanizadeh et al. ....... 370/404 |

* cited by examiner

*Primary Examiner*—Yves Dalencourt
(74) *Attorney, Agent, or Firm*—Clements Walker; Christopher L. Bernard; Tyler S. Brown

(57) ABSTRACT

A system and method automatically maps network addresses of a first protocol for a plurality of network elements in a first network to network addresses of a second protocol. A table is defined and maintained in each network element of the plurality of network elements. An identifier within the first protocol for each network element of the plurality of network elements and an address corresponding to the second protocol-for each network element of the plurality of network elements is assigned and stored in the table. The first protocol identifier is associated with the address corresponding to the second protocol within the table for each network element of the plurality of network elements.

13 Claims, 5 Drawing Sheets

| TID | IP ADDRESS | PORT NUMBER | EXPIRATION TIMER |
|---|---|---|---|
|  |  |  |  |
|  |  |  |  |
|  |  |  |  |

| MESSAGE TYPE | TTL | LENGTH |
|---|---|---|
| 1ST NODE TID (OCTETS 0 - 3) ||| 
| 1ST NODE TID (OCTETS 4 - 7) |||
| ⋮ |||
| 1ST NODE TID (OCTETS 60 - 63) |||
| 1ST NODE IP (OCTETS 0 - 3) |||
| 1ST NODE STATUS |||
| ⋮ |||
| NTH NODE TID (OCTETS 0 - 3) |||
| NTH NODE TID (OCTETS 4 - 7) |||
| ⋮ |||
| NTH NODE TID (OCTETS 60 - 63) |||
| NTH NODE IP (OCTETS 0 - 3) |||
| NTH NODE STATUS |||

FIG. 6

ADDRESS RESOLUTION PROTOCOL TO MAP INTERNET PROTOCOL ADDRESSES TO A NODE TRANSPORT IDENTIFIER

FIELD OF THE INVENTION

The present invention relates generally to communication networks, and more specifically to a system for resolving address protocols between Internet protocol addresses and other types of network node addresses.

BACKGROUND OF THE INVENTION

Large computer networks, such as Wide Area Networks (WAN) or Internet backbone systems often incorporate various types of network devices (nodes) and network protocols. For example, for Synchronous Optical Network (SONET) systems, most communication between transport nodes uses the OSI (Open System Interconnection) over the DCC routing protocol to establish and route traffic between two nodes. The OSI model is a layered framework for distributed processing and networking in a multi-vendor environment. The OSI environment includes data communication protocols to manage data movement among network nodes and uses application-oriented protocols to ensure that once the data is transferred, it can be understood and processed by an application process. Typically, the overall system environment for large-scale networks use node manufacturer's proprietary software and services to fulfill distributed processing requirements. This type of network system redirects data from internal processes to the network interface.

Under the OSI model, functionally similar protocols are grouped into seven layers. These layers are: the physical layer, data link layer, network layer, transport layer, session layer, presentation layer, and application layer, with each layer providing services to the layer above it. The physical, link, and network layers are network dependent and use data communication protocols to control communication between two network nodes. The application, presentation, and session layers are application oriented and use protocols that let end user application interact using services offered by each node's local operating system. The transport layer uses services provided by the network dependent lower layers to provide the application oriented layers with a messaging service that is independent of the network.

In general, SONET networks use the TL-1 (Transport Layer 1) standard to communicate network management commands to the shelf. The TL-1 standard uses a particular type of address, called a Transport Identifier (TID) address, to address different nodes in the network. Typically, software is often used to map TID address received in a TL-1 command to addresses used by the OSI stack. Typical SONET systems using Bellcore/Telcordia equipment, have a special application called Terminal identification Address Resolution Protocol (TARP) that is used to map TID addresses to Network Service Access Point (NSAP) addresses used by the OSI stack. The Network Service Access Point is the point at which OSI Network Service is made available to a transport layer entity.

With ever increasing use of network communications, such as the Internet, usage for the IP stack increases. To support this increased demand, systems engineers have begun implementing systems for supporting IP over the Data Communications Channel (DCC), instead of the OSI stack. Most SONET Data Communications Channel is allocated for line data communication and is a 192-kbps message-based channel (using DCC in the section overhead) that is typically used for alarms, maintenance, control, monitoring, administration and communication needs between two section terminating nodes. The use of IP over DCC allows IP commands to be transported to any resident or remote network element on the SONET ring. Current systems, however, generally do not provide efficient mechanisms to provide TID to IP mapping over DCC. Although manual address mapping for gateway devices may be available, such manual methods are highly cumbersome, time-consuming, and prone to errors.

What is needed, therefore, is a system that automatically and efficiently maps TID addresses received within TL-1 messages to IP addresses over DCC for SONET networks.

SUMMARY OF THE INVENTION

A system and method of automatically mapping network addresses of a first protocol for a plurality of network elements in a first network to network addresses of a second protocol is described. In one embodiment, Transport Identifier (TID) addresses are mapped to Internet Protocol (IP) addresses for nodes in a network. According to embodiments of the present invention a table is defined and maintained in each network element of the plurality of network elements. An identifier within the first protocol for each network element of the plurality of network elements is assigned and stored in the table. An address corresponding to the second protocol for each network element of the plurality of network elements is also assigned and stored in the table. The first protocol identifier is associated with the address corresponding to the second protocol within the table for each network element of the plurality of network elements. An update timer is further associated with each protocol identifier for each network element in the first network. The first network protocol identifier is propagated from each network element at periodic intervals. The update timer associated with each network element is reset upon propagation of a first network protocol identifier from that network element. If the update timer for that network element reaches a predetermined count value, the network element is removed from the table.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicates similar elements, and in which:

FIG. 6 illustrates a message table that incorporates node status information, according to one embodiment of the present invention.

DETAILED DESCRIPTION OF THE INVENTION

A system for mapping IP addresses to a node's Transport Identifier (TID) address is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Embodiments of the address mapping system of the present invention can be used with various types of network protocols and systems. These networks can be copper or fiber based systems that implement various network protocols such as Internet Protocol (IP), and the like. In an exemplary embodiment, the address protocol system is implemented in a SONET (Synchronous Optical Network) based fiber optic network.

Figure 1:
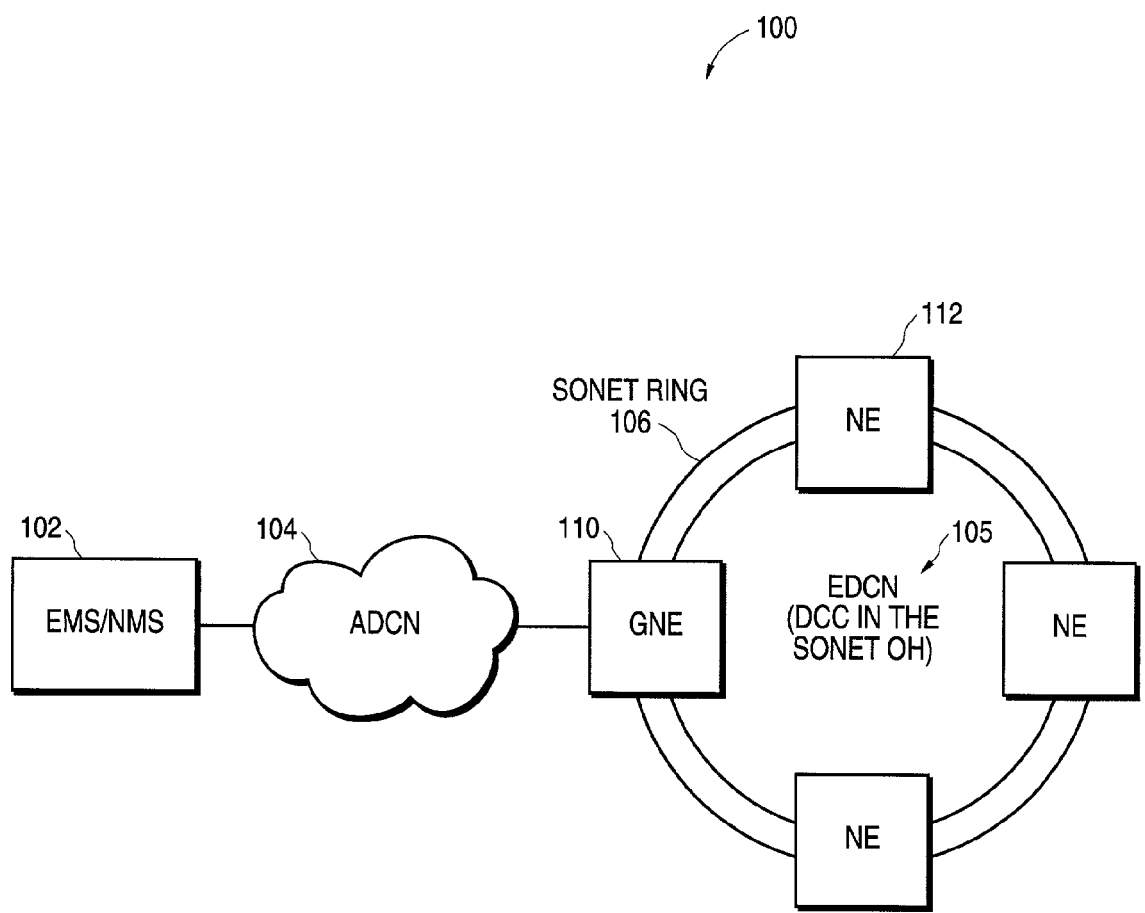
FIG. 1 is an architectural diagram of a data communication network incorporating a SONET ring that implements an address provisioning mechanism, according to one embodiment of the present invention.

FIG. 1 is an architectural diagram of a data communication network incorporating a SONET ring that implements an address provisioning mechanism, according to one embodiment of the present invention. The communication network illustrated in FIG. 1 carries control information to manage the different nodes in the network, and is divided into two segments, the Access Data Communication Network (ADCN) and the Embedded Data Communications Network (EDCN) 105. In one case, the Embedded Data Communication Network represents a generic network that implements an addressing structure that might be different than that implemented by the Access Data Communication Network. For the example illustrated in FIG. 1, the Embedded Data Communication Network 105 is a SONET network that uses the OSI protocol stack over the Data Communication Channel for communication between the node elements 112.

The Access Data Communication Network 104 consists of all the links that connect the operator and the network management tools 102 to the SONET ring 106. The network management tools 102 are typically referred to as an Element Management System (EMS) or Network Management System (NMS), depending upon the level of management provided by the tool. The Access Data Communication Network 104 is coupled to the SONET ring through a Gateway Network Element ("gateway" or GNE) 110. The Access Data Communication Network links typically use IP over Ethernet or IP over Frame Relay to communicate with the Gateway Network Element.

A SONET network generally uses two or four transmission paths between network nodes in a ring configuration The SONET ring 106 includes a number of network elements (nodes) 112 coupled through fiber paths. Some network elements can be implemented as, or include, a digital cross-connect system (DCS) or add-drop multiplexor (ADM). The actual type of device embodied by the network elements 112 depends upon the network environment and application in which the SONET ring is used. The ring that connects the nodes 112 together in a SONET network is typically a bi-directional counter-rotating ring. Various different ring topologies are possible, such as four-fiber bi-directional line switched rings or two-fiber uni-directional path switched rings, and can be used in conjunction with embodiments of the present invention.

In communication network 100 of FIG. 1, communication between the network management system 102 and a given node in the Embedded Data Communication Network 105 is accomplished using TL-1 messages over OSI. Each TL-1 message is provided with a Transport Identifier (TID) that identifies the node to which the message is addressed. Communication over the Access Data Communication Network 104 can have multiple formats. The typical format may be a basic ASCII TL-1 message transmitted over a serial link.

In many current systems, the Embedded Data Communication Network 105 network uses OSI protocols. Network elements in a communications system are generally represented as logical entities. Each network element must have a unique identifier or address that enables it to be properly accessed by the protocols within the seven-layer OSI model. When the OSI stack is used, a TARP (Terminal identification Address Resolution Protocol) application associates the NSAP (Network Service Access Point) address to each TID received. In this case messages from the Access Data Communication Network that use TL-1 are routed correctly using readily available application programs. However, as demand for IP resources increases, many systems integrators are migrating Embedded Data Communication Network networks to IP protocols, instead of OSI. For these systems, the gateway node element 110 for the Embedded Data Communication Network 105 must map the TID of a TL-1 message received on the Access Data Communication Network to an IP address and IP packets before they can be sent over the Embedded Data Communication Network 105. In general, if the IP addresses of the different elements on the ring are directly addressable by the operator (EMS/NMS), then no address mapping is required. However, it is desirable to prevent the need to advertise the IP addresses of all of the node elements individually and make the operator see only the GNE address. Therefore, an address mapping scheme is needed.

In one embodiment of the present invention, an address resolution protocol is included that maps the IP address of the destination node based on the TID address received in the TL-1 message. In many present systems in which IP is used over the EDCN, address mapping between the TID addresses of TL-1 messages and IP addresses is accomplished through an address table typically built manually in the gateway network element 110. Embodiments of the present invention provide a means by which the mapping table is built automatically, similar to how the TARP application associates an NSAP address to each TID received for systems in which the Embedded Data Communication Network uses OSI.

Figures 2, 3:
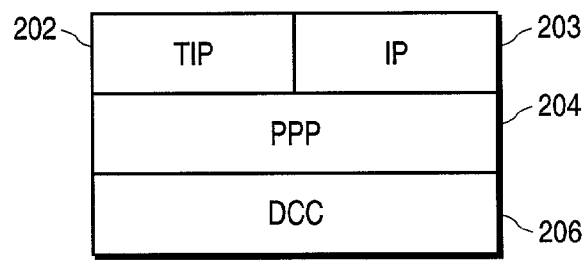
FIG. 2 illustrates the hierarchy of the TID to IP layer above a PPP and DCC protocol layer, according to one embodiment of the present invention.
FIG. 3 is a table that illustrates the parameters for mapping a TID value to an IP address, according to one embodiment of the present invention.

In one embodiment of the present invention, the address resolution protocol for mapping TID to IP for Access Data Communication Network to Embedded Data Communication Network networks is implemented as a layer that resides above the PPP (Point-to-Point) protocol. Among other roles, PPP is the Internet Standard for transmission of IP packets over serial lines, FIG. 2 graphically illustrates the hierarchy of the TID to IP layer (denoted "TIP") 202 above the PPP 204 and DCC 206 protocol layers. As illustrated in FIG. 2, TIP operates in parallel and independently of IP layer 203, and does not use any of the IP standards to operate. The DCC 206 layer is in the SONET overhead layer. A dedicated code segment in the protocol field of a PPP frame identifies the TIP application for the dispatching of PPP frames.

Each node 112 within the Embedded Data Communication Network supports a mapping table where each row contains various parameters that dictate the address resolution for the Embedded Data Communication Network ring. FIG. 3 is a table that illustrates the parameters for mapping a TID value to an IP address, according to one embodiment of the present invention. The TID entry 302 specifies the TID value for which the IP address is bound to. The IP address 304 specifies the IP address associated to the given TID.

Table 300 also includes a port number 306. Each node has multiple DCC channels over which it can communicate. The port number specifies which particular DCC channel an IP address resides. That is, the port number corresponds to a port, which corresponds to a specific DCC that can have multiple IP addresses. The port number specifies the correct port on which the message with the given TID should be transmitted. The port number can be used in cases where multiple rings are connected to the same node.

Also included in Table 300 is an expiration timer value 308. The expiration timer is a timer that controls the continuance of the TID address. This timer is reset whenever a broadcast arrives that contains the binding. If a timer expires, the entry is removed from the table. This prevents the storage of stale information and frees up unused table space. Upon initiation, the mapping table 300 is empty. It should be noted that various other parameters can be included in Table 300 of FIG. 3, such as parameters or table entries for functions such as, error checking, performance enhancements, flow control, among other such functions.

The nodes in network 100 of FIG. 1 are divided into two functional types of nodes. The first node is the gateway node 110, and the second type of nodes comprises the network elements 112. The gateway node (GNE) logically and physically couples the Access Data Communication Network to the Embedded Data Communication Network. In one embodiment, only the IP address of the gateway node 110 is advertised. The gateway node receives a TL-1 command from the operator on the Access Data Communication Network 104. The gateway 110 then recovers the TID address from the message and looks in the mapping table 300 for the corresponding IP address. If an entry for the TID is found, the IP address is recovered and an IP message is created accordingly and sent onto the Embedded Data Communication Network. If an entry is not found in the table, the TL-1 message is discarded and a deny answer is returned to the operator. For example, with reference to FIG. 1, for the EMS to transmit data to node element 112, the EMS transmits to the IP address of GNE 110 and includes a TID address for node element 112. The GNE 110 then determines the separate IP address available for the EDCN 105 to communicate to node element 112. The IP addresses for the nodes within EDCN 105, other than the GNE 110 are hidden from the EMS 102, and thus an address mapping scheme is necessary to access the network element 112 using its specific IP address.

In one embodiment, the mapping table is automatically built, and is stored in each network element in the Embedded Data Communication Network. Each active network element should contain an identical mapping table 300. For this embodiment, nodes are divided into two groups depending upon whether they are single-network nodes or multi-network nodes. A single-network node is coupled to one network only, while a multinetwork node is connected to more than one network.

Figure 4:
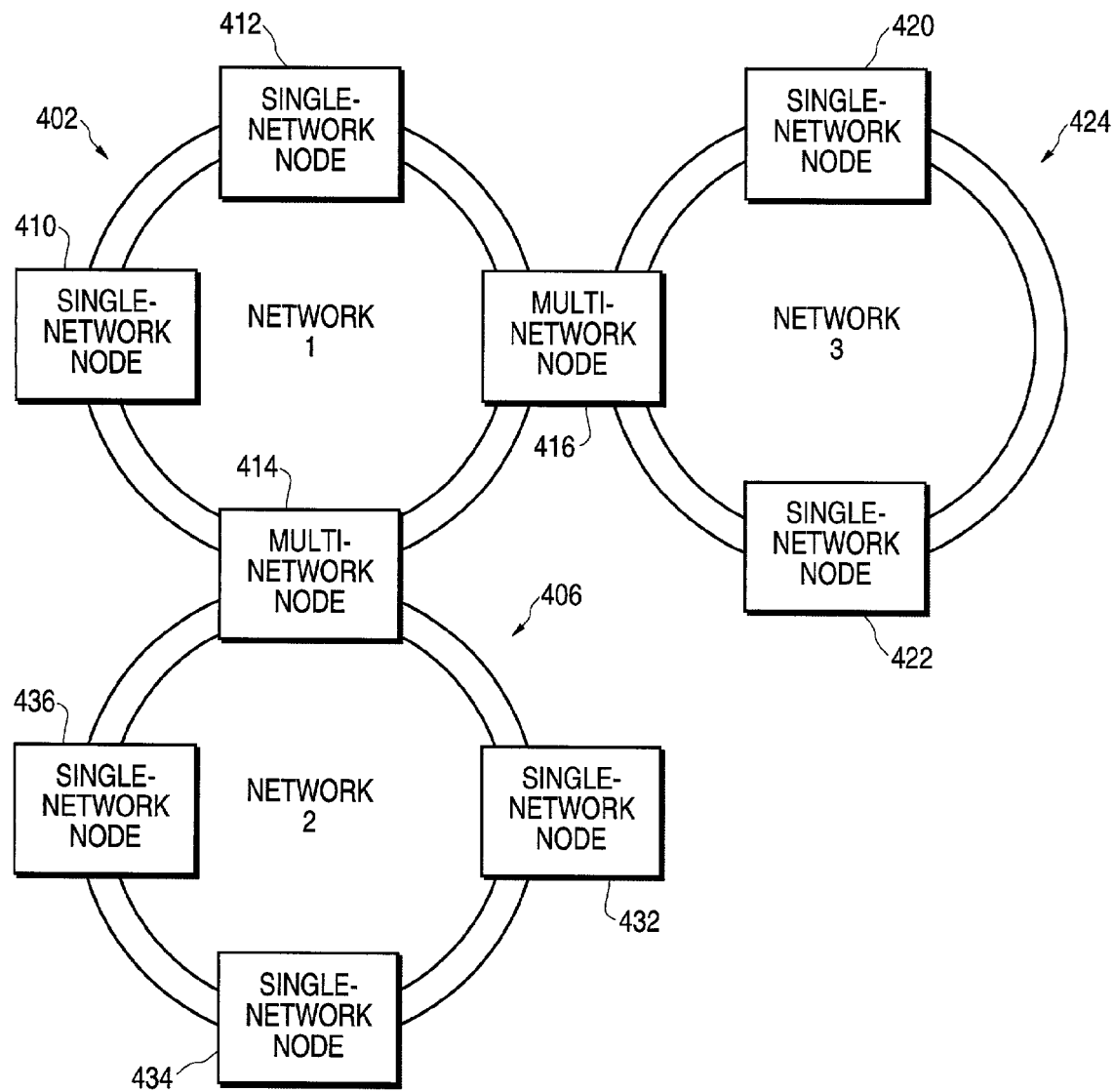
FIG. 4 illustrates a compound network consisting of single-network and multi-network nodes.

FIG. 4 illustrates a compound network consisting of single-network and multi-network nodes. Network 402 includes single-network nodes 410 and 412 and multinetwork nodes 414 and 416. Multi-network node 416 couples network 402 to network 404, which includes single-network nodes 420 and 422. Multi-network node 414 couples network 402 to network 406, which contains single-network nodes 432, 434, and 436.

All network nodes, regardless of whether they are single or multi-network nodes advertise their Node IP/TID pair to all other nodes on the network to which they are connected. In addition, multi-network nodes advertise their Network IP/TID pairs. This mechanism consists of advertising the IP/TID pairs on one network to another network.

Figure 5:
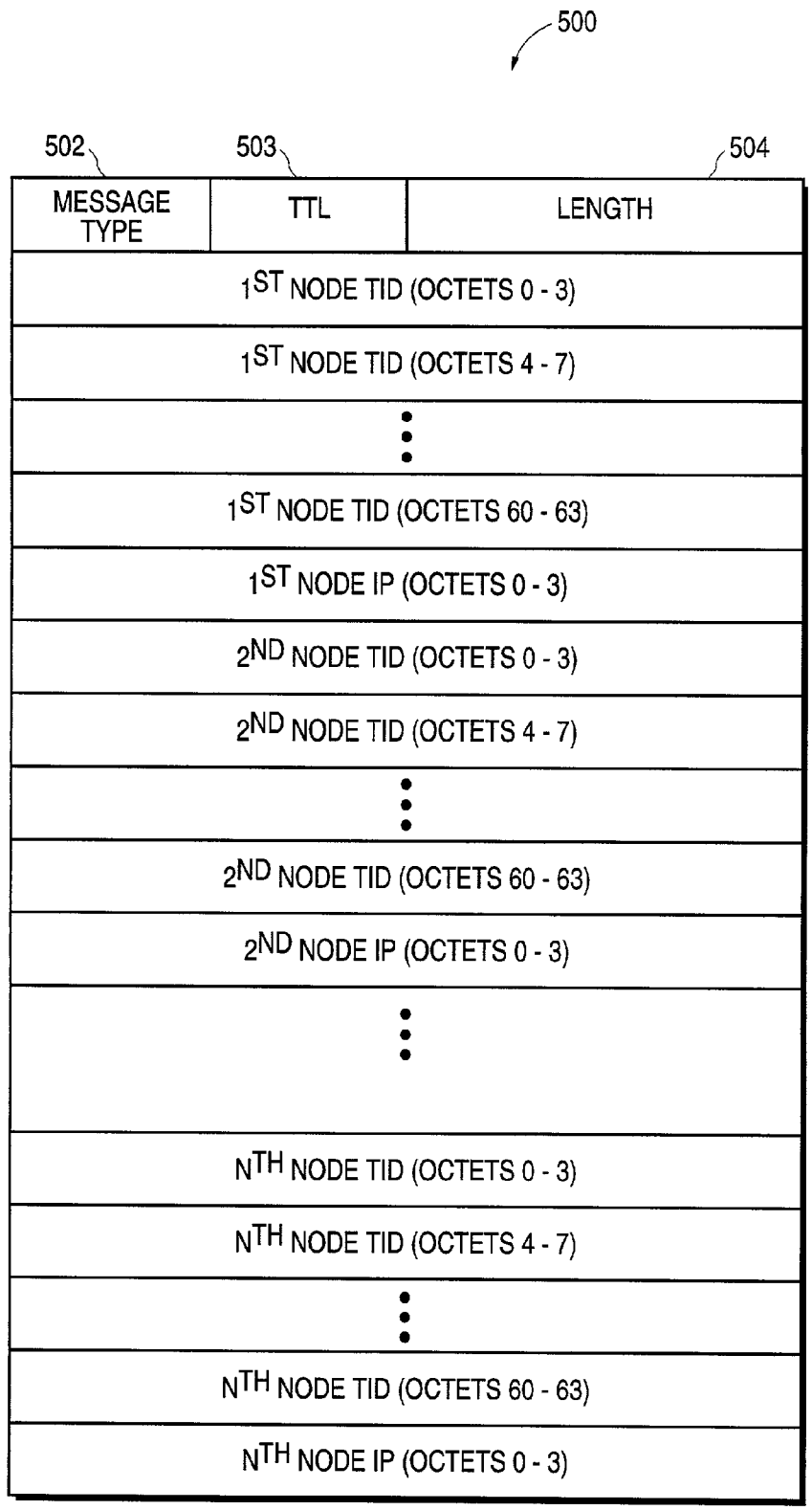
FIG. 5 is a table that illustrates the composition of a TIP Hello Message, according to one embodiment of the present invention.

To advertise the IP/TID pairs that will allow the different nodes to build the mapping table 300, the nodes use a special message, called a "TIP Hello Message". FIG. 5 is a table that illustrates the composition of a TIP Hello Message, according to one embodiment of the present invention. The parameters of the TIP Hello Message include a Message Type 502 that identifies the type of message. In one embodiment, two types of messages may be defined, a node_advertising_message and a network_advertising_message, depending upon whether the message being propagated refers to the advertising node only or multiple nodes in the network. The message type field is one byte in length.

Table 500 also includes a Time-to-Live (TTL) field 503 of one byte in length, which specifies a finite life-span of the messages to prevent messages from infinitely circulating around the ring. When a message is received by a node, the count value in the TTL field is reduced by one, until it reaches zero, at which point it is deleted. This field is used in cases such as when an advertising node transmits an advertising message and dies after sending the message, no node is present to remove the sent message. The TTL value allows such a message to be deleted after a specified period of time, after for example, one or two rounds of the ring. Every node that receives a message decreases the TTL value by one, and the node that causes the TTL count value to be reduced to zero removes the message.

Table 500 in FIG. 5 also includes a length parameter 504 that indicates the number of entities in a message. For example, every entity may consist of a 64-byte TID information and a 4-byte IP information. For a node_advertising_message, the length value is always equal to one. In this case, the node only sends its own information. The Node TID field provides the TID of a node, and the Node IP field provides the IP address corresponding to the node TID.

For every period of time, the single-network node advertises its node IP/TID pair, while the multi-network node advertises both their node IP/TID pair as well as the Network IP/TID pairs. To advertise a node IP/TID pair, the node sends a TIP Hello message on the DCC channel connecting it to a ring. The neighboring node receives the message and updates its mapping table based on the content of the message. If the entry already exists in the table, the corresponding expiration timer is reset. Once the table is updated, the message is forwarded to the next node on the ring. The message keeps going from one node to the other until it returns to the sender. At this point the message is deleted and removed from the ring. For all entries in which the expiration timer expires before a new Hello message is received, the entry is removed from the table.

For advertising the network IP/TID pairs, multi-network nodes will gather the pair received on one of the networks and advertise the whole set to the nodes on the other networks.

Once the table is set up for each active node and a message received from the Access Data Communication Network, the IP address for the appropriate destination node is recovered and the IP packets are correctly transmitted with all of the normal IP transmission characteristics. Once the TIP table is built in each active node, the IP protocol handles the transmission of the message.

For multiple network systems, such as that illustrated in FIG. 4, a port ID number is used to differentiate between the multiple rings in the network. Thus, for example, in FIG. 4, the ring consisting of nodes 410, 412, 414, and 416 may be denoted network 1 and given a Port 1 assignment in table 300, and the ring consisting of nodes 414, 436, 434, and 434 may be denoted network 2 and given a Port 2 assignment in table 300. For a multiple ring network, the TIP table for one network is periodically transmitted to the other connected networks by the common network element. Thus, for Networks 1 and 2 in FIG. 4, network node 414 periodically propagates the TIP table for one ring to the other ring, and vice-versa. The length of the message in this case is equal to the number of the nodes in the ring. Each network element that receives this message then appends this information to its own TIP table. In one embodiment, the period with which the ring TIP tables are propagated to the other rings in the network must be the same, e.g., every 15 minutes, however, the ring tables need not be updated simultaneously with one another. Once the compound or multiple ring tables are built in each active network node, the nodes use standard IP stacks.

For certain network topologies, the deletion or inactivity of a particular node may cause the creation of infinite loop conditions. For example, in a simple three node ring network A-B-C, node A advertises to both B and C, B advertises to both A and C, and node C advertises to both A and B. If node A is deleted, nodes B and C may continue to advertise A, and therefore keep their respective tables up-to-date for A. This creates an infinite loop for node A even though this node no longer exists. For extended networks, this condition can create loops that are very difficult to detect, and that can reduce or hinder network performance. To prevent this problem, in one embodiment of the present invention, a node status for each node is maintained by a network node for each ring. This node status information is maintained in a message table similar to that illustrated in FIG. 5.

FIG. 6 illustrates a message table that incorporates node status information, according to one embodiment of the present invention. Table 600 includes a node status field for each node, for example, field 602 for the first node, and field 604 for the Nth node. Each node can be specified as a "New" node, an "Updated" node, or a "Deleted" node. Thus, the node status field 602 contains a binary pattern that corresponds to one of the three possible statuses of node 1, that is, whether node 1 is a new, updated, or deleted node. In this manner, each node can maintain the status of the other nodes in the network. If a particular node is added, the network nodes update their respective tables to indicate that this is a new node. Similarly, if a particular node is updated, the network nodes update their respective tables to indicate that this is an updated node. If a network node detects that a particular node has died, e.g., if that node has not been updated recently, the network node can send a message stating that the particular node has been deleted. All other nodes can then update their tables accordingly to reflect that a particular node has been deleted. In the example given above, if node A is deleted, both B and C will transmit messages stating that node A has been deleted, and thus B and C will cease advertising A. Thus for a deleted node, the other nodes will propagate a message that will eventually cause all of the other nodes to remove references for that node from their tables.

Although the above description refers to an Embedded Data Communication Network that comprises a SONET network, it should be noted that embodiments of the present invention may be used in other types of networks that utilize IP addressing schemes, and that require mapping of addresses from TID or similar types of addresses.

In the foregoing, a system has been described for mapping IP addresses to a node's TID address in a SONET network or similar type of Embedded Data Communication Network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of automatically mapping network addresses of a first protocol for a plurality of network elements in a first network to network addresses of a second protocol, comprising the steps of:

defining a table maintained in each network element of the plurality of network elements;

wherein the table maintained in each network element of the plurality of network elements is built automatically;

assigning an address corresponding to the first protocol for each network element of the plurality of network elements;

assigning an address corresponding to the second protocol for each network element of the plurality of network elements;

associating the addresses corresponding to the first and second protocols within the table for each network element of the plurality of network elements, the second protocol being a different protocol than the first protocol;

advertising an association of the addresses corresponding to the first and second protocols, allowing each network element of the plurality of network elements to build the table; and wherein each of the network elements utilize the first protocol addresses to transmit data destined for other network elements via the first network, wherein the first protocol is Internet Protocol (IP) and the second protocol is Transport Identifier (TID), and wherein the addresses corresponding to the Internet Protocol (IP) are mapped to addresses corresponding to the Transport Identifier (TID) associating an update timer with the first protocol address for each network element in the first network; propagating the first protocol address from each network element in the first network at periodic intervals; resetting the update timer associated with each network element in the first network upon propagation of the first protocol address from that network element; removing a network element from the table if the update timer for that network element reaches a pre-determined count value; and wherein the first network is a SONET ring network and the first network protocol comprises the Internet protocol operating over a SONET Data Communications Channel protocol.

2. The method of claim 1, further comprising the step of defining a port number for each network element in the first network.

3. The method of claim 2, wherein the first network is coupled to a second network, the method further comprising the step of associating a port number with the network to which the network element is coupled.

4. The method of claim 1, wherein the first network is configured in a ring topology.

5. The method of claim 1, wherein the first network is a point-to-point network.

6. The method of claim 1, further comprising the step of maintaining a status of each network element is in the table.

7. The method of claim 1, wherein the status of each network element comprises one of new node, updated node, and deleted node.

8. The method of claim 1, wherein the table is empty upon initiation.

9. A method of associating a network address of a network element within a SONET ring network to a second network utilizing Internet Protocol addressing, the method comprising the steps of:

assigning a Transport Identifier address to each of a plurality of network elements within the SONET network;

assigning an Internet Protocol address to each of a plurality of network elements within the SONET network;

advertising an Internet Protocol address of a gateway node coupling the SONET network to the second network;

transmitting a message to the gateway node, the message including a Transport Identifier address of the network element to be accessed;

maintaining a table in the gateway node that specifies respective Transport Identifier addresses with associated Internet Protocol addresses for each network element within the SONET ring network;

wherein the table maintained in each network element within the SONET ring network is built automatically; and transmitting the message to the network element whose Internet Protocol address corresponds to the transmitted Transport Identifier address associating an update timer with each network element in the SONET ring network; resetting the update timer associated with each network element upon propagation of a Transport Identifier address from that network element; removing a network element from the table if the update timer for that network element reaches a pre-determined count value; and wherein the SONET ring network implements an Internet protocol operating over a SONET Data Communications Channel protocol.

10. The method of claim 9, further comprising the step of maintaining a status of each network element in the table.

11. The method of claim 10, wherein the status of each network element comprises one of new node, updated node, and deleted node.

12. The method of claim 11, wherein the table comprises a plurality of entries including node Transport Identifier address, Internet Protocol address, and status information for each network element in the SONET ring network.

13. The method of claim 9, wherein the table is empty upon initiation.

* * * * *